(12) United States Patent
Luo et al.

(10) Patent No.: US 10,275,164 B2
(45) Date of Patent: Apr. 30, 2019

(54) ENFORCING PERSISTENCY FOR BATTERY-BACKED MOBILE DEVICES

(71) Applicant: NUtech Ventures, Lincoln, NE (US)

(72) Inventors: Hao Luo, Lincoln, NE (US); Hong Jiang, Lincoln, NE (US); Lei Tian, Lincoln, NE (US)

(73) Assignee: NUtech Ventures, Lincoln, NE (US)

( * ) Notice: Subject to any disclaimer, the term of this patent is extended or adjusted under 35 U.S.C. 154(b) by 333 days.

(21) Appl. No.: 15/167,378

(22) Filed: May 27, 2016

(65) Prior Publication Data

US 2016/0350015 A1 Dec. 1, 2016

Related U.S. Application Data

(60) Provisional application No. 62/166,916, filed on May 27, 2015.

(51) Int. Cl.
*G06F 3/06* (2006.01)
*G06F 12/02* (2006.01)
*G06F 17/30* (2006.01)

(52) U.S. Cl.
CPC .......... *G06F 3/0619* (2013.01); *G06F 3/0631* (2013.01); *G06F 3/0647* (2013.01); *G06F 3/0653* (2013.01); *G06F 3/0673* (2013.01); *G06F 12/023* (2013.01); *G06F 12/0246* (2013.01); *G06F 17/30* (2013.01); *G06F 2212/1032* (2013.01); *G06F 2212/161* (2013.01); *G06F 2212/171* (2013.01);
(Continued)

(58) Field of Classification Search
CPC .... G06F 3/0619; G06F 3/0631; G06F 3/0647; G06F 3/0653; G06F 3/0673; G06F 12/023; G06F 12/0246; G06F 17/30; G06F 2212/1032; G06F 2212/161; G06F 2212/171; G06F 2212/214; G06F 2212/222; G06F 2212/7203
See application file for complete search history.

(56) References Cited

U.S. PATENT DOCUMENTS

2002/0152228 A1* 10/2002 Lopez ................. G06F 9/451
2006/0004946 A1* 1/2006 Shah ................... G06F 13/28
711/100

(Continued)

OTHER PUBLICATIONS

'agigatech.com' [online]. "AGIGARAM NVDIMMs," dated Nov. 10, 2008 [retrieved on Oct. 11, 2018]. Retrieved from the Internet: URL http://www.agigatech.com. 5 pages.
(Continued)

*Primary Examiner* — Larry T Mackall
(74) *Attorney, Agent, or Firm* — Fish & Richardson P.C.

(57) ABSTRACT

In one implementation, a computer-implemented method can include receiving, at a driver running on a mobile computing device with a local power source, a command from an application for an allocation of volatile memory; allocating, by the driver, memory from a pool of volatile memory for the application; storing data in the allocated memory; detecting, by the driver, that a particular situation currently exists on the mobile computing device that will cause the data to be lost; and performing, by the driver, an operation with regard to the memory and the data that will cause the data to be preserved following a conclusion of the particular situation.

20 Claims, 9 Drawing Sheets

(52) U.S. Cl.
CPC .. *G06F 2212/214* (2013.01); *G06F 2212/222* (2013.01); *G06F 2212/7203* (2013.01)

(56) References Cited

U.S. PATENT DOCUMENTS

2013/0145085 A1* 6/2013 Yu .................. G06F 12/0246
711/103
2015/0324254 A1* 11/2015 Prasad ............... G06F 11/1402
707/642

OTHER PUBLICATIONS

'developer.android.com' [online]. "Storage Options," Feb. 13, 2009 [retrieved on Apr. 21, 2017]. Retrieved from the Internet: URL http://developer.android.com/guide/topics/data/data-storage.html. 8 pages.
'itcafe.hu' [online]. "Controlling the Android," dated Oct. 2011 [retrieved on Nov. 26, 2018]. Retrieved from the Internet: URL: http://itcafe.hu/dl/cnt/2011-11/78806/controlling-the-android.pdf. 19 pages.
'sqlite.org' [online]. "Atomic Commit in SQLite," dated Nov. 17, 2007 [retrieved on Nov. 26, 2018]. Retrieved from the Internet: URL http://sqlite.org/atomiccommit.html 29 pages.
'www.vikingtechnology.com' [online]. "ArxCis-NV™: Non-Volatile Memory Technology," dated Nov. 5, 2012 [retrieved on Apr. 21, 2017]. Retrieved from the Internet: URL www.vikingtechnology.com/arxcis-nv, 2 pages.
Agrawal et al., "Mobile data sync in a blink," Presented as part of the 5th USENIX Workshop on Hot Topics in Storage and File Systems, USENIX, 2013, 5 pages.
Bhattacharjee et al., "Enhancing recovery using an SSD buffer pool extension," Proceedings of the Seventh International Workshop on Data Management on New Hardware, ACM, 2011, pp. 10-16.
Candea et al., "Microreboot—a technique for cheap recovery," OSDI, 2004, 4: 33 pages.
Chen et al., "The Rio file cache: Surviving operating system crashes," ACM SIGPLAN Notices, ACM, 1996, 31: 74-83.
Cinque, "Enabling on-line dependability assessment of android smart phones," Dependable Systems and Networks Workshops, IEEE, 2011, 6 pages.
Coburn et al., "Nv-heaps: making persistent objects fast and safe with next-generation, nonvolatile memories," ACM SIGARCH Computer Architecture News, ACM, 2011, 39: 13 pages.
Depoutovitch and Stumm, "Otherworld: giving applications a chance to survive OS kernel crashes," Proceedings of the 5th European conference on Computer systems, ACM, 2010, 11 pages.
Jaeyoung Do et al., "Fast peak-to-peak behavior with ssd buffer pool," Data Engineering (ICDE), 2013 IEEE 29th International Conference On. IEEE, 2013, 12 pages.
Jaeyoung Do et al., "Turbocharging DBMS buffer pool using SSDs," Proceedings of the 2011 ACM SIGMOD International Conference on Management of data, ACM, 2011, 12 pages.
Jeong et al., "I/O stack optimization for smartphones," USENIX ATC, 2013, pp. 309-320.
Kim et al., "Resolving journaling of journal anomaly in android I/O: Multi-version B-tree with lazy split," USENIX FAST, 2014, pp. 273-285.
Kim et al., "Revisiting storage for smartphones," ACM Transactions on Storage, 2012, 14 pages.
Lee et al, "Unioning of the buffer cache and journaling layers with non-volatile memory." USENIX FAST, 2013, pp. 73-80.
Maji et al., "Characterizing failures in mobile oses: A case study with android and Symbian," In Software Reliability Engineering. IEEE, 2010, 10 pages.
Narayanan and Hodson, "Whole-system persistence," ACM SIGARCH Computer Architecture News, ACM, 2012, 40: 401-410.
Shen et al., "Journaling of journal is (almost) free," In Proceeding of the 12th USENIX Conference on File and Storage Technologies, FAST, 2014, pp. 287-293.
Volos et al., "Mnemosyne: Lightweight persistent memory," ACM SIGARCH Computer Architecture News, ACM, 2011, 39: 13 pages.
Zhao et al., "Kiln: closing the performance gap between systems with and without persistence support," Proceedings of the 46th Annual IEEE/ACM International Symposium on Microarchitecture, ACM, 2013, 421-432.

* cited by examiner (a) SQLite Page Cache Size (b) SQLite Transaction Size

ENFORCING PERSISTENCY FOR BATTERY-BACKED MOBILE DEVICES

CROSS-REFERENCE TO RELATED APPLICATIONS

This application claims the benefit of priority to U.S. Provisional Application Ser. No. 62/166,916, entitled ENFORCING PERSISTENCY FOR BATTERY-BACKED MOBILE DEVICES and filed on May 27, 2015, the entire contents of which are herein incorporated by reference.

FEDERALLY SPONSORED RESEARCH

The disclosed technology was made with government support under grants CNS-1116606 and CNS-1016609 awarded by the National Science Foundation. The government has certain rights in the technology.

TECHNICAL FIELD

This document generally describes technology related to persistently storing data on computing devices.

BACKGROUND

Mobile computing devices, such as smartphones and tablets, can be equipped with a variety of hardware components, such as multi-core processors, large-capacity DRAM, and/or and flash storage devices. Input/output (I/O) performance of mobile computing devices, such as reading from and/or writing to non-volatiles memory, can be a significant factors in the overall performance of applications that are running on mobile computing device. To maintain data consistency and integrity, mobile computing devices can use embedded databases, such as SQLite, Shared Preference key-value stores, and/or the file system API to save persistent data to local non-volatile memory, such as flash memory and/or hard disk. Such embedded databases can operate by storing a small amount of structured data in volatile memory and can rely upon the non-volatile memory (e.g., file systems) to store larger, unstructured data objects, such as images and documents. To ensure updates are performed in a persistent fashion, which includes atomicity, consistency, and durability, such embedded databases can employ journaling and/or file-level double-write.

For example, the SQLite database uses rollback journal or write-ahead log to track the changes to the database table files. In another example, the Shared Preference (stored as an xml file in the file system) and some applications that store important data in files use file-level double-write to avoid data loss when modifying important files. In such an implementation, the whole file, instead of the modified parts, can be written to a temporary file that will subsequently be renamed. In a further example, the underlying EXT4 file system uses metadata journaling to ensure data consistency. This can add significant overhead to and thus substantially degrade system performance by increasing I/O traffic with extra data written to the flash storage. For example, SQLite can cause mobile computing devices to perform Journaling of Journal (JOJ), which refers to the double-journaling phenomenon in which the file system is journaling the database journal activities. Additionally, double writing of data can further shortens the lifetime of non-volatile memory, such as flash storage devices, in mobile computing devices.

SUMMARY

In one implementation, computing device includes one or more processors; a local power source that provides power to the computing device; volatile memory that is configured to persistently store data and instructions to be used by the one or more processors so long as the computing device is continuously supplied with power by the local power source or an external power source; non-volatile memory that is configured to persistently store data and instructions; a library that is programmed to receive memory commands from applications that are installed on the computing device; and a driver that is programmed to (i) manage the volatile memory, (ii) monitor for situations on the computing device in which data stored in the volatile memory will be lost, (iii) in response to detecting a first type of the situations, remap volatile memory for one or more of the applications, and (iv) in response to detecting a second type of the situations, flush the volatile memory to the non-volatile memory, wherein management of the volatile memory includes performing the memory commands received by the library.

Such a computing device can optionally include one or more of the following features. The volatile memory can be random access memory (RAM). The RAM can be dynamic RAM (DRAM). The power source can be one or more batteries. The non-volatile memory can be flash memory. The computing device can be a mobile computing device. The memory commands can include one or more of: memory allocation commands, memory retrieval commands, and memory freeing commands. The first type of the situations can be the one or more applications crashing and restarting on the computing device. The first type of the situations can be the one or more applications hanging and restarting on the computing device. The first type of the situations can be an operating system running for the computing device rebooting. The second type of the situations can be a hard reset being initiated on the computing device.

In another implementation, a computer-implemented method can include receiving, at a driver running on a mobile computing device with a local power source, a command from an application for an allocation of volatile memory; allocating, by the driver, memory from a pool of volatile memory for the application; storing data in the allocated memory; detecting, by the driver, that a particular situation currently exists on the mobile computing device that will cause the data to be lost; and performing, by the driver, an operation with regard to the memory and the data that will cause the data to be preserved following a conclusion of the particular situation.

Such a computer-implemented method can optionally include one or more of the following features. The operation can be remapping the data in the pool of memory for the application. The particular situation can be the application crashing and restarting on the mobile computing device. The particular situation can be the application hanging and restarting on the computing device. The particular situation can be an operating system running for the computing device rebooting. The operation can be flushing the data from the volatile memory to non-volatile memory on the mobile computing device. The particular situation can be a hard reset being initiated on the computing device.

Implementations can include one or more of the advantages described below. For example, qNVRAM can be used to create persistent data in volatile memory on mobile computing devices without adding additional hardware components to the devices. This can increase the performance of the mobile computing devices, while at the same time avoiding any increased costs that may be associated with additional hardware components like hardware needed for NVDIMM and WSP.

In another example, qNVRAM can provide improved endurance of flash SSDs (and other SSDs) based on qNVRAM reducing the number of write operations to the flash memory. Additionally, a smaller number of write operations with qNVRAM can improve energy efficiency based on reduced energy consumption associated with the write operations.

One or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
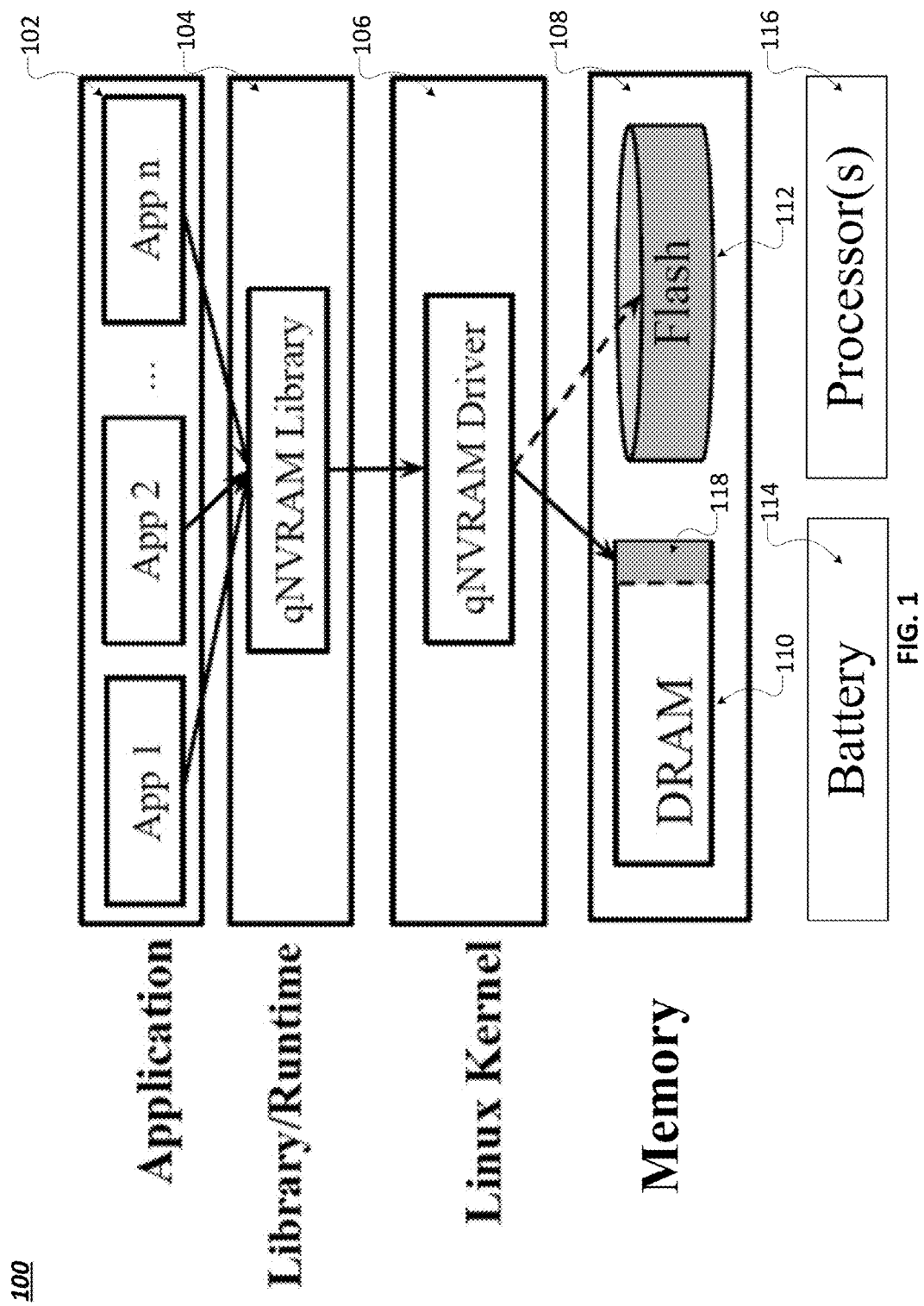
FIG. 1 depicts an example qNVRAM architecture an example mobile computing device.

This document generally describes techniques, systems, and devices for persistently storing data on computing devices using volatile memory, such as dynamic random access memory (DRAM). In particular, volatile memory can be made to operate in a persistent manner as quasi non-volatile memory (qNVRAM) through the use of libraries and drivers to maintain data in volatile memory and, at particular instances (e.g., device power off), to flush the data to non-volatile memory. Such use of qNVRAM can allow for persistency to be achieved without the heavy overhead of other techniques, such as techniques using journaling and/or double-writing to provide persistency.

Persistent storage options on mobile computing devices (e.g., smartphones, tablet computing devices, laptops, battery-supplied computing devices) can include journaling or double-write to enforce atomicity, consistency, and durability, which can introduce significant overhead to system performance. Much of this overhead may be unnecessary if the volatility of memory is reconsidered in light of the battery-backed characteristics of volatile memory, such as DRAM, in current mobile devices, such as smartphones (e.g., IPHONE, ANDROID devices). qNVRAM can allow volatile memory in mobile computing devices, such as DRAM in smartphones and tablets, to act as quasi non-volatile memory, which can help remove the performance overhead of enforcing persistency and can increase the speed and efficiency of processes (e.g., operating system processes, applications) running on the mobile computing devices. Many implementations of qNVRAM are possible, such as a persistent page cache for embedded databases, such as SQLite. Using qNVRAM can provide a variety of advantages, such as significantly speeding up insert, update, and/or delete transactions.

A variety of mechanisms have been proposed to reduce the overhead of enforcing persistency in mobile computing devices. In one example, the I/O stack is tuned, by, for instances, external journaling in the EXT4 file system and write-ahead logging in SQLite. In another example using Multi-Version B-Tree (MVBT), the recovery information is integrated into the database file itself so that the journal file is avoided, and therefore reduce the number of fsync( ) calls, which resolves the JOJ anomaly. A third example, on the other hand, is to reduce the overhead of file system journaling by applying simple techniques that ensure a single I/O operation on the synchronous commit path and adaptively allow each file to have its custom file system journaling mode.

Another option would be to perform in-place updates with some form of non-volatile cache (NV cache), such as Phase Change Memory (PCM), and thus avoid almost all the overhead of enforcing persistency. Moreover, a NV cache can significantly improve the performance of enterprise databases, and reduce the overhead of recovery by achieving a fast peak-to-peak restart. However, adding non-volatile memories like PCM into mobile computing devices may increase their size and cost.

To gain some of the same advantages of NV cache systems while using existing mobile computing device components (without adding additional cost or size associated with PCM), qNVRAM techniques can be used to create a quasi non-volatile RAM design for mobile computing devices. qNVRAM can take advantage of the "battery-backed" nature of the mobile computing devices to make the data in qNVRAM non-volatile under almost all the failure conditions, except for a sudden power loss condition (e.g., physically pulling out the battery). qNVRAM can be used to drastically speed up the transaction performance of embedded databases, such as SQLite, among a few other possible use cases. qNVRAM can be used as an alternative and/or as a compliment to the other solutions mentioned above, such as MVBT, single I/O commit, and/or file adaptive journaling.

This document describes a variety of details below regarding qNVRAM, such as common failure modes in mobile computing devices, what happens to the application's data in memory during such failure modes, and what it means to memory volatility in each failure mode; example implementations of qNVRAM that manages a small piece of physical memory, and writes back the data to the flash storage when the hard reset is performed; and example implementations of Persistent Page Cache (pPCache) in SQLite as a qNVRAM use case. For example, with pPCache the dirty pages generated by transactions can be coalesced and flushed asynchronously, so that the number of fsync( ) calls is significantly reduced. The flush can be done in-place (IPU), which can trade data consistency and durability for higher performance, and/or by appending to a write-ahead log (FL), which provides consistency guarantee but a slightly lower performance than IPU.

A variety of experiments were performed using qNVRAM. In some of the experiments that are discussed below, results were generated using a SAMSNUNG GALAXY S4 smartphone and, for example, demonstrated that the pPCache can outperform the write-ahead logging (WAL) mode in transaction throughput of random inserts, updates, and deletes by factors up to 16.33×, 15.86×, and 14.13×, respectively, and can reduce the latency of random inserts, updates, and deletes by up to 93.0%, 92.8%, and 93.0%, respectively.

Non-Volatility and Persistency

Battery-backed memories, which have been used in RAID controllers, can augment DRAM (or sometimes synchronous RAM (SRAM)) with rechargeable batteries or an uninterruptable power supply (UPS). When the power fails the batteries/UPS can sustain the volatile memory content for seconds to days that is sufficient to flush dirty data to the persistent storage and shut down operating systems safely. Some separate hardware components, such as non-volatile dual in-line memory modules (NVDIMM) (e.g., AgigaRAM and ArxCis-NV), can be used to establish persistency without the use of a battery/UPS backup. For instance, battery-free NVDIMM consists of three components, DRAM, an ultra-capacitor, and NAND flash. Upon power failures, the NVDIMM will be signaled by the host and save the DRAM contents to the flash. The data can be restored from the flash during recovery. The NVDIMM can give the illusion of a non-volatile memory to the host systems. Whole System Persistence (WSP) designs can maintain the transient state of the whole system by flushing registers and caches in processors to the NVDIMM when a power failure is detected and WSP can recover the system's entire state upon a power-up, making power failures look like a suspend/resume event. qNVRAM achieves quasi non-volatility in a similar way by flushing the data from physical memory to the flash when the hard reset is detected. However, compared to NVDIMM and WSP which need extra hardware components to achieve persistency, qNVRAM can be implemented without additional hardware components or cost (e.g., implemented as a pure software-based approach).

There are a variety of ways in which applications can persist and recover data or even system state after a failure. One classic solution applications commonly deploy is using databases, which persist database pages in non-volatile devices using a redo/undo log or copy-on-write (COW) mechanism. In another example, file caches can be used to can make main memory safe for persistent storage by enabling memory to survive operating system crashes. In a further example, software-based mechanisms can be used to recover from kernel panics or application component failures.

Example Failure Modes in Mobile Computing Devices

Example types of high-level manifestations of common failures, or failure modes, in mobile computing devices include (1) application crash (an app stops working unexpectedly), (2) application hang (an app is still active but delivering a constant output, e.g., blocked in an infinite loop or deadlocked), (3) self-reboot (the system forces a reboot as a consequence of a severe problem, e.g., kernel panic), and (4) system freeze (the system delivers a constant output and does not respond to the user's input). Such failure modes may be found in any of a variety of processes, such as web browser applications, multimedia applications, and kernel layer processes. Failure modes, however, may be more prevalent in third party applications, such as web browser applications and multimedia applications, than in kernel layer processes.

Different things happen to the volatile memory (e.g., DRAM) that was being used by applications and processes when failure modes occur. For instance, when an application failure (i.e., failure mode (1) or (2)) happens, the volatile memory that was used by the application will, for example, be reclaimed by the OS. When the self-reboot (i.e., failure mode (3)) happens, the data in volatile memory will be lost since, for example, the OS will recreate page tables for applications in the virtual memory system after the reboot; when the system freezes (i.e., failure mode (4)) happens, a user-initiated recovery will be performed and the mobile computing device can be forced to power-off by hard reset if it is still freezing, which can cause all of the data in DRAM to be lost. From the application's point of view, the data in volatile memory will be lost under each of these four example failure modes. Persistent storage options using embedded databases in mobile computing devices hedge against such failures by using multi-versioning to ensure update atomicity by storing the original data and modified data in two different places (journal/temporary file and the real data respectively) in the non-volatile storage (e.g., flash memory). qNVRAM can be used to hedge against the same failure modes and without duplicating the data in non-volatile memory.

Overhead of Persistency Enforcement with Journaling and Double-Writing

Figure 3:
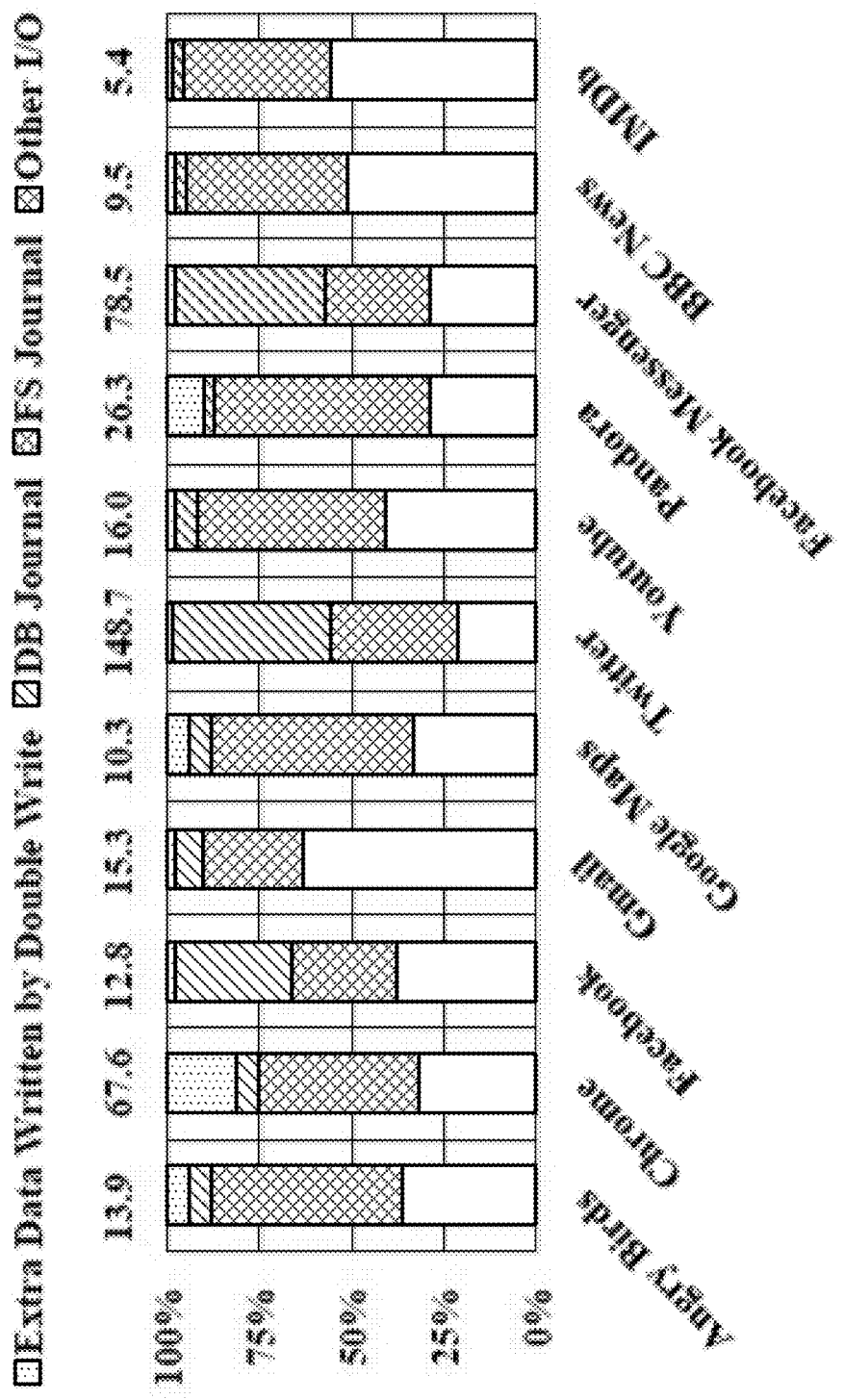
FIG. 3 is a chart that depicts the I/O overhead for popular mobile apps using journaling and double-writing techniques for data persistency.

Journaling and double-write schemes can introduce significant overhead to the storage system due to extra data transfers that result in additional I/Os. For example, FIG. 3 is a chart that depicts the I/O overhead for popular mobile apps using journaling and double-writing techniques for data persistency. In the examples depicted in FIG. 3, 11 top-ranked popular mobile computing device apps were run (using the example steps described in Table 1 below) on a SAMSUNG GALAXY S4 smartphone with a modified block I/O path in the Linux kernel to trace block-level I/O requests, including the logical block number (LBN), request size, inode number, and the filename (if it is written to a file). The SHA-1 hash was also calculated for every 4 KB chunk of a write request to identify redundant data blocks. The amount of extra data written to the flash storage resulting from maintaining atomicity is shown in FIG. 3.

TABLE 1

| Application | Example Operations Performed |
| --- | --- |
| ANGRY BIRDS | Open the app, play for the first three levels, close the app |
| CHROME | Open the app, load 30 pre-defined web pages one by one, close the app. |
| FACEBOOK | Open the app, "drag" the screen 5 times to load news feeds, post 3 status, send 3 messages, close the app. |
| GMAIL | Open the app, load 3 new emails, search emails for 3 different key words, compose and send 3 emails, close the app. |
| GOOGLE MAPS | Open the app, enter the source and destination addresses and obtain directions, zoom into the map 5 times, close the app. |
| TWITTER | Open the app, "drag" the screen 5 times to load news feeds, , post 5 new tweets, close the app. |

TABLE 1-continued

| Application | Example Operations Performed |
|---|---|
| YOUTUBE | Open the app, play 5 videos, each for 1 minute, close the app. |
| FACEBOOK MESSENGER | Open the app, send 50 messages, and receive 50 messages, close the app. |
| BBC NEWS | Open the app, load the latest news feed in 6 topics, close the app. |
| IMDB | Open the app, load the homepage, load the top news, load the top 50 popular TV programs, close the app. |
| PANDORA | Open the app, load the recommendations, play 5 songs from 5 different radios, close the app. |

For these example application, 37% to 78% of the data written to the flash storage was written exclusively for the purpose of enforcing atomicity. For example, more than 75% of all data written by the TWITTER application is going to the file system and database journals, while 18% of all data written by the CHROME application appears to be unnecessary since it was not modified in the file updates. Based on these results, the overhead associated with journal and double-writing techniques for persistency enforcement can be significant.

As discussed above, several solutions have been proposed to reduce the overhead of persistency enforcement. For example, a set of I/O stack optimizations have been proposed to reduce the overhead of JOJ, including using fdatasync( ) instead offsync( ), using log-structured file system, external journaling based on a separate device, polling-based I/O, and WAL mode in SQLite instead of other journal modes. In another example, MVBT can integrate the recovery information into the database file itself and reduce the number fsync( ) calls as well as the number of dirty pages which need to be synchronized to flash in a single fsync( ) call. In a further example, single I/O data journaling, which only writes the file data and metadata to the file system journal in a single I/O on the synchronous commit path, has been proposed to reduce the overhead of file system journaling.

Characteristics of Databases in Mobile Computing Devices

Unlike the enterprise databases, the database tables in mobile computing devices can be relatively small in size and, as a corollary, the size of transactions can be small as well. Table 2 below identifies the example characteristics of 453 database files in 3 smartphones. In particular, Table 2 shows the statistics about the size of the database files. Across all three devices, the average size of SQLite database files was about 166 KB, and the median size is only 28 KB. Small database files were observed for a couple reasons. First of all, the set of mobile applications tended to be small, compared to the enterprise databases. A number of mobile applications store their configuration/user preferences in SQLite, which leads to small database files with only several rows in the table. Secondly, many applications use the local database as a client-side cache to store some of the latest/popular data. For instance, the FACEBOOK MESSENGER application was found to store the latest messages in the messages table. The application only loaded earlier messages from the server and inserted them into the message table only when a user requested the messages. The same behavior was also observed in the GMAIL application, which only stores recently received/viewed emails in its mailstore and deletes stale content from mailstore.

TABLE 2

| | Num of db files | Database file size (KB) | | |
|---|---|---|---|---|
| | | Average | Max | Median |
| Phone 1 | 170 | 127 | 6808 | 28 |
| Phone 2 | 67 | 209 | 6443 | 37 |
| Phone 3 | 216 | 212 | 5521 | 26 |

Figure 4A:
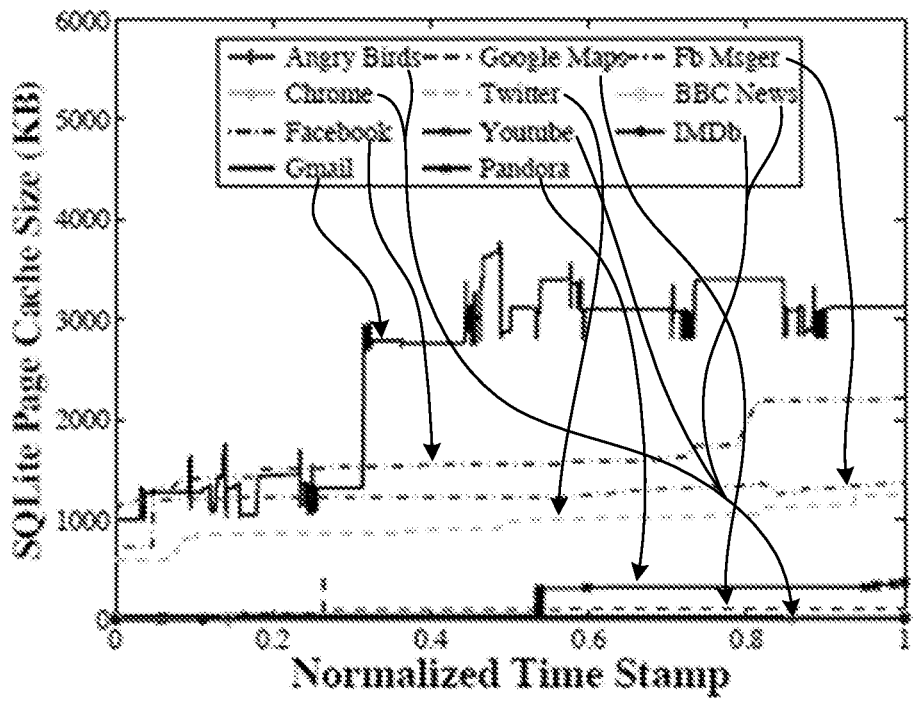
FIGS. 4A-B depict the results of rerunning the application benchmarks of Table 1 on a mobile computing device with a modified SQLite library.
Figure 4B:
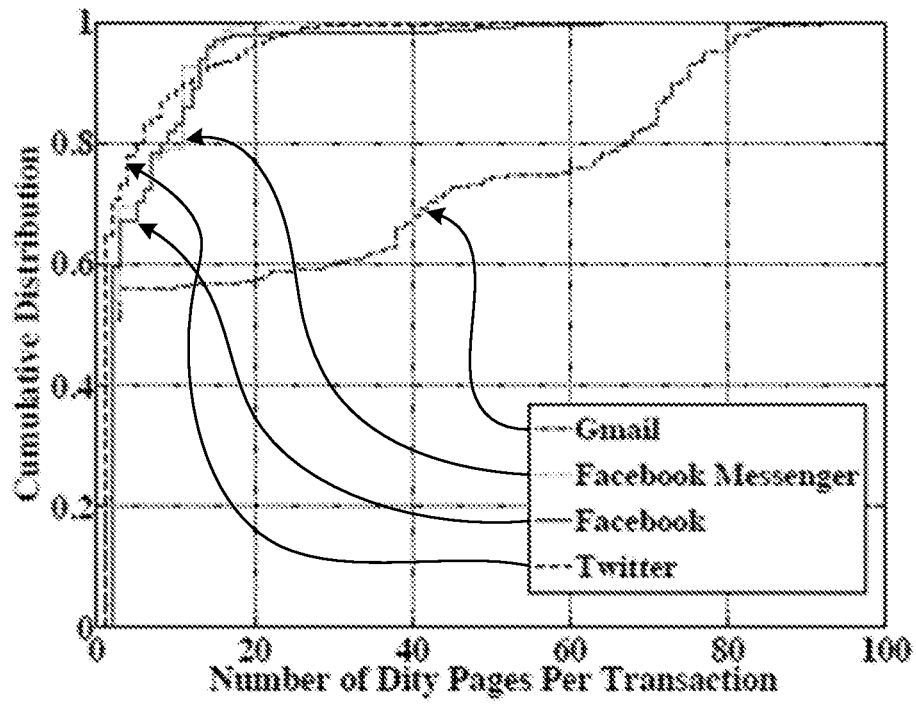

As a result, the page cache used by SQLite in mobile applications tends to be very small. FIGS. 4A-B depict the results of rerunning the application benchmarks of Table 1 on a mobile computing device with a modified SQLite library. In particular, the SQLite library has been modified to monitor the dynamic behavior of the page cache memory usage and the size of the transactions in different applications. The overall page cache size in each application is plotted in FIG. 4A, where each application may open multiple database files and thus create multiple page cache instances. Note that the page cache sizes of the FACEBOOK, GMAIL, TWITTER, and FACEBOOK MESSENGER mobile applications all start at a non-zero value because they are already running in the background as services on the mobile computing device. Considering that most smartphones run one user-facing application at a time and the background applications consume much less page cache, a small piece of qNVRAM can be able to meet the requirements of most mobile applications.

Moreover, the transaction size in the mobile databases was found to also be extremely small. Using 4 applications that frequently use the SQLite database to store structured data, as shown in FIG. 4B, SQLite traces were collected from a one-day use. The cumulative distribution of the number of dirty pages in these 4 applications are depicted in FIG. 4B. In all four applications, more than 50% of all transactions generate less than 5 dirty pages, and the maximum numbers of dirty pages in one transaction in the GMAIL, FACEBOOK MESSENGER, FACEBOOK, and TWITTER mobile applications was found to be 92, 59, 82, and 65, respectively. This was determined to be a result of the small size of each record in the tables used by these applications. For example, the FACEBOOK MESSENGER message record includes message metadata (e.g., the source of message), some transient states of a message (e.g., whether it is pending sending media file), and the message content, while the media files (e.g., pictures and videos) are stored in a separate file in the EXT4 file system. The record can actually be small in size, and the new message can be inserted into the database when it is received. Therefore, the size of the transaction can be small.

Memory Volatility in Mobile Computing Devices

A fundamental assumption in most transactional systems that maintain a durability property, not limited to database systems, is that the memory is volatile. Thus they may pay a high cost to enforce data integrity and consistency through either journaling or copy-on write techniques. Some modern systems incorporate nonvolatile memory, such as NVDIMM and PCM, to help eliminate the burden of enforcing persistency and boost the performance. However, the adoption of the NVM for mobile platforms is infeasible for reasons of cost and size, which are two of the most important design considerations for mobile computing devices. Nevertheless, the batteries in mobile computing devices, especially the non-removable batteries, can potentially make the DRAM (and other volatile memory) non-volatile for practical purposes as explained below.

Despite of the possibility of some unknown bugs powering off mobile computing devices unexpectedly, the probability of that happening is considered extremely small. Reports have shown that there is a small incident of unexpected/random power-offs on mobile computing devices (i.e., 0:05% of 19,670 issue reports related to defects in the ANDROID operating system). Such reports also indicated that hardware faults (if within a warranty period) usually result in the device being returned and entered into a reverse logistics process for repair or replacement. While physically pulling out the battery will lead to unrecoverable memory data loss, increasingly mobile computing devices are being designed with irremovable batteries, which makes this situation rare. Therefore, in practice, mobile computing devices that suffer some hardware faults resulting in the device going offline for repair or replacement make recovery from data loss in these cases essentially superfluous.

Therefore, qNVRAM can be used to trade the data persistency in very rare cases for the performance boost in all cases and without increasing the cost and/or size of mobile computing devices. Some small changes to the current system design can preserve data persistency against the aforementioned four common failure modes, summarized in Table 3 below. When an application failure (mode 1 or 2) happens, the persistency can be automatically achieved if the OS is able to preserve the application data that is critical to the transactions, such as the page cache in database, and restores the data to the application when it restarts. When self-reboot (mode 3) happens, the data can be preserved and retrieved over reboot if the data is stored in a piece of physical memory at a fixed known location since DRAM does not lose power during reboot. When the system freezes (mode 4), it may result in a hard reset, which may be the worst case scenario. The hard reset, on some mobile computing device, may be triggered by a user pressing the power button for 10 seconds, which is long enough for both capturing the action and flushing the important data to the flash storage, just like the NVDIMM. Table 3 shows what happens to the memory data and how to retrieve the data when the application restarts.

provides power to the mobile computing device 100; and one or more processors 116 that run the applications 102 using the other components of the device 100.

The library 104 is programmed to implement a continuous memory allocator, which provides an easy-to-use programming interface for the applications 102 to obtain and release a piece of the qNVRAM memory. An example of the interface is depicted in Table 4 below. The applications 102 can allocate and free a piece of the qNVRAM memory 110 using qnvmalloc and qnvmfree during normal execution, and retrieve the memory content using qnvmretrieve upon failure recovery.

TABLE 4

| Function | Description |
| --- | --- |
| void *qnvmalloc(int uid, int magic, int size); | Allocates a piece of the qNVRAM memory, returns the pointer value to the memory in application's address space. |
| void qnvmfree(int uid, int magic); | Frees a piece of the qNVRAM memory. |
| void *qnvmretrieve(int uid, int magic, int *size); | Retrieves a piece of the qNVRAM memory using the uid and the magic number, returns the pointer to the memory in application's address space. |

The kernel-space device driver 106 reserves a small chunk 118 of the physical memory 110, referred to as the qNVRAM pool, when the kernel boots up. The physical memory 110 will be mapped into the user space when the applications 102 requests/retrieves the corresponding memory from the qNVRAM pool 118. The driver 106 is also responsible for flushing data from memory 110 to the flash storage 112 under certain circumstances. In a first example scenario, the qNVRAM is flushed when the user tries to perform hard reset. To capture this action, the power button interrupt handler can be modified so that it can notify the driver 106 of the pressing event. When the button is pressed for 5 seconds, the driver 106 will start flushing data to the flash storage. A flush-on-fail mechanism used with qNVRAM can be is similar to but different from the Whole

TABLE 3

| | | | Memory data survivability | | |
| --- | --- | --- | --- | --- | --- |
| | Failures mode | Result in | In application address space | In physical memory | How to restore data |
| Common Failures | (1) Application crash | Application restart | N | Y | Remap physcial memory |
| | (2) Application hang | Application restart | N | Y | Remap physical memory |
| | (3) Self-reboot | Kernel reboot | N | Y | Re-map physical memory |
| | (4) System-Freeze | Hard reset by the user | N | N | Flush memory data to flash when hard reset |
| Rare Failures | Sudden power loss | Total power loss | N | N | N/A |

Architecture of qNVRAM qNVRAM can be used to make data in DRAM non-volatile against almost all the failures in mobile computing devices. FIG. 1 depicts an example qNVRAM architecture an example mobile computing device 100. The example qNVRAM for the mobile computing device 100 includes applications 102 that are running on the mobile computing device 100; a library 104 that provides a programming interface to the applications 102; a kernel driver 106 that manages the physical memory 108, which includes volatile memory 110 (depicted in this example as DRAM) and non-volatile memory 112 (depicted in this example as flash memory); a battery 114 (example local power supply) that System Persistence (WSP) approach. qNVRAM can also have save and restore routines that flush/load data to/from the underlying flash storage 108. In the save routine of qNVRAM, for example, a control processors (from the processors 116) is interrupted and suspends all other processors 116 for a short time in which it will copy the data content in the whole qNVRAM pool 118 to a separate memory buffer for flush, so as to ensure that the data flushed is a consistent copy of the qNVRAM pool 118. This may result in a short "stall" (e.g., approximately 37 ms to finish the copying of 20 MB data in a SAMSUNG GALAXY S4 smartphone under experimentation). But considering that when the power button has been pressed for such a long time, this short stall is unnoticeable since the mobile computing device must hang already or the button is pressed accidentally without user's notice. The difference between qNVRAM and WSP is that, upon failure, the latter is triggered by a dedicated power monitor to flush all data in CPU registers and caches to NVDIMM, while the former flushes data in DRAM 110 to the flash storage 108 without relying on the dedicated hardware for signaling.

Another example scenario for the flush is when the qNVRAM pool 118 is under memory pressure. When the allocator cannot find enough space in the qNVRAM pool 118, it will trigger the flush operation to swap out the memory associated with the processes that have already been killed. In this case the memory 110 to be flushed is not mapped into any running application's address space so that no processor 116 is writing to it and thus can be flushed safely in the background without interrupting other processors. When the application 102 restarts, the data in qNVRAM 118 will be loaded into the memory 110 for recovery.

The size of the qNVRAM pool 118 can be adjusted at compile time. In some implementations, the size of the qNVRAM pool 118 is set to be 20 MB (only 1% of the 2 GB physical memory in the SAMSUNG GALAXY S4 smartphone). The size of the qNVRAM pool 118 can be based on a variety of factors, such as the size of persistent memory needed to enforce atomicity (e.g., SQLite page cache), which may usually be small, and/or the sequential write bandwidth of the mobile computing device that is available for flushing the pool 118. For instance, the applications 102 consume only up to several MB memory as the page cache, and the transaction size in mobile computing device applications can be quite small. Therefore, the example 20 MB space can be big enough as long as the page cache can accommodate the dirty pages generated by the transactions. In another example, to be flushed to the flash storage 108 before the mobile computing device 100 is powered off, for example, by a hard reset, a size for the pool 118 can be selected based on the sequential write bandwidth so that the pool 118 can be fully flushed before the powering-off of the device 100 occurs. For instance, the SAMSUNG GALAXY S4 has a sequential write bandwidth of 15 MB/s, which means that a flush of 20 MB data from the pool 118 can occur in around 1.3 seconds, which is well within the 5-second window between capturing the hard button press event and power-off.

The metadata of qNVRAM, including an allocation table, can be stored at the beginning of the physical memory 110, and any update to the allocation table can be journaled in qNVRAM such that the update is atomic. When the system 100 restarts, the kernel module 106 can check whether the data in the physical memory 110 that qNVRAM reserves is valid by checking a signature string in the metadata of qNVRAM. If the signature does not match, the kernel module 106 can try to load data from the flush area. The checksum of the whole qNVRAM pool 118 can be calculated and flushed to the flash storage 112 upon flush-on-fail and can be used to verify the data integrity of the flushed data.

Flush-on-Fail in qNVRAM

Unlike the Rio file cache, the qNVRAM system 100 does not have an uninterruptible power supply, which can cause the DRAM 110 to lose power upon hard reset. A flush-on-fail mechanism can be incorporated into the system 100, for example as part of the qNVRAM driver 106, to flush data from memory 110 to the flash storage 112 when the user tries to perform hard reset. When a button is pressed for 4 seconds (or other steps are taken by a user to perform a hard reset), the driver 106 can start flushing data to the flash storage 112. This flush-on-fail mechanism can be similar to but different from the Whole System Persistence (WSP) approach. The qNVRAM system 100 also has save and restore routines that can flush/load data to/from the underlying flash storage 112. In the save routine of qNVRAM, the control CPU 116 stops all other CPUs 116 for a short time in which it can copy the data content in the whole qNVRAM pool 118 to a separate memory buffer for flush. This can ensure that the data flushed is a consistent copy of the qNVRAM pool 118. The checksum of the whole qNVRAM pool 118 can be calculated and flushed to the flash storage 112 upon flush-on-fail and can be used to verify the integrity of the flushed data. The flushed data can be invalidated by setting checksum to 0 after a clean shutdown and/or reloading the flushed data into the qNVRAM pool 118. If the user releases the power button before the system 100 is powered off, the flushed data can be invalidated. Therefore, the flushed data should only be valid after a successful hard reset.

The difference between qNVRAM and WSP is that, upon failure, the latter is triggered by a dedicated power monitor to flush all data in CPU registers and caches to NVDIMM, while the former flushes data in DRAM 110 to the flash storage 112 without relying on any dedicated hardware for signaling. Because the save routine may not be executed as expected, mechanisms may be needed to ensure that the data can be flushed within a small time window. To achieve this goal, a hardware watchdog can be used in our design. Hardware watchdogs have been widely deployed in the latest mobile devices. The watchdog timer (WDT) can reset the system 100 in the case of a watchdog timeout. In our implementation, the WDT timeout can be set to 5 seconds, and the qNVRAM driver 106 can send a heartbeat to the watchdog every 4 seconds by resetting the WDT so that the system will not reboot. The power key interrupt handler can be modified so that when the power key is pressed it will reset the WDT, disable the heartbeat and schedule a delayed work in 4 seconds. The delayed work can execute the save routine if the key has not been released. In case the delayed work does not get scheduled in time, WDT will time out and the system 100 reboots. When the delayed work executes, it can reset WDT and start flushing data to the flash storage 112. The WDT will be reset upon the completion of the save routine. If the data cannot be flushed to the flash storage 112, the system 100 will reboot due to the WDT timeout. In this case, the data remains safe in DRAM 110 because DRAM 110 does not lose power. The WDT timeout and flush time window are tunable and should be adjusted based on the hardware specifications.

qNVRAM Design Space qNVRAM architecture in the system 100 provides quasi non-volatile memory that can be used to boost the performance of the applications 102 by reducing the reliability-induced write I/Os. For example, an SQLite database can use the qNVRAM memory as a persistent page cache so that the database journaling I/Os can be avoided or batched, which can significantly reduce the number of I/Os written to the file system 108 as well as the number fsyncOcalls. In another example, the file system 108 can build a persistent buffer cache for the metadata update to reduce the journaling I/Os. In an EXT4 file system, one metadata update can result in eight 4 KB blocks written to the file system journal, which is a small amount of data that can be well accommodated in the qNVRAM memory. In another example, the application 102 can also store the updated parts of the file and perform in-place update to the file in the file system 102 to avoid rewriting the whole file.

qNVRAM is a nearly non-volatile memory which can be used to help improve performance and recover from crash failures. However it may not provide transactional properties (atomicity, consistency and durability). The user of qNVRAM, like the user of other NVRAM (e.g., database and persistent heaps), can be responsible for implementing these properties. To this end, in the qNVRAM use case of the persistent page cache in SQLite, described below, the qNVRAM system was implement both the IPU mode and the FL mode, of which the latter provides these properties while the former relaxes some requirements in favor of higher performance.

qNVRAM Case Study—Persistent Page Cache in SQLite

Figure 2:
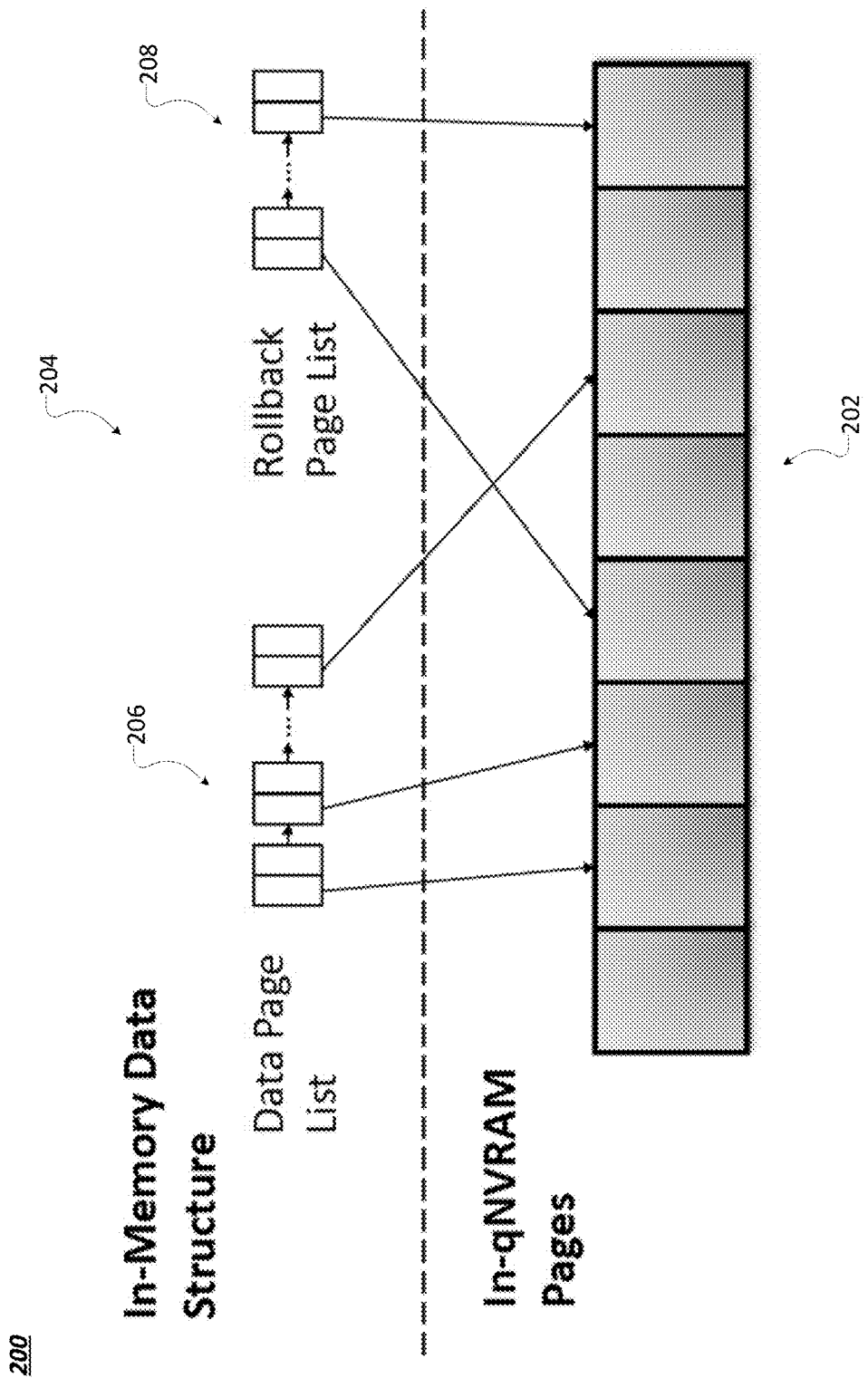
FIG. 2 depicts an example design and implementation of a qNVRAM system using as a Persistent Page Cache in SQLite.

FIG. 2 depicts an example design and implementation of a qNVRAM system 200 using as a Persistent Page Cache in SQLite. In this example, the persistent page cache, referred to as (pPCache) is implemented in SQLite (e.g., SQLite 3.7.12) using an qNVRAM API. The pPCache consists of a piece of the qNVRAM memory 202 and some in-memory data structures 204 (e.g., two lists and a hash table), which is volatile upon any failures and can be rebuilt during recovery. The metadata of pPCache (e.g., free page bitmap and state of the transactions) is stored at the beginning of the qNVRAM memory 202, and the rest is divided into multiple pages, each of which has the same size as a database page. The information about a page, such as the type of the page (rollback page or data page) and the state of the page (dirty or clean), can be embedded in the page header.

These pages in qNVRAM are organized in two lists, the data page list 206, which can store the latest version of the database pages, and the rollback page list 208, which can store the original copy for the modified pages in the pending transactions. The pages in the rollback page list 208 can form an undo log, which can be used to quickly revert to the old version of the page content of a transaction when it aborts.

The page cache can have three states: no-wr-tx (no pending write transaction exists), in-flight (one write transaction has begun), and committing (one write transaction is committing). The pPCache can support one write transaction at a time, while multiple read transactions may coexist at the same time. This may not affect the concurrency of SQLite since SQLite allows at most one write transaction per page cache at any one time. When a write transaction begins, the state of the transaction is changed from no-wr-tx to in-flight. Before the transaction modifies a page, the original data content of that page can be copied into a new page. The new page can be marked as a rollback page and then added to the rollback page list 208. The pages in the rollback page list 208 can be dynamically allocated during a transaction, so that it is transient and will not consume too much memory space considering that the number of dirty pages in a transaction in mobile computing devices is very small. When the transaction commits, the state of the page cache is changed to committing, and all pages in the rollback page list 208 will be freed and the page header and free page bitmap are updated accordingly. After this is done, the state of the transaction can be changed to no-wr-tx. Updating the page cache state can involve one store instruction to the memory so that it is atomic. The recovery of the Persistent Page Cache can rely on the atomicity of the transaction state update.

A high/low watermark scheme can be used to flush dirty pages to the database file. In this scheme, when the number of dirty pages reaches the low watermark (LWM) upon a transaction commit, the database will start to flush dirty pages, and the number of dirty pages in pPCache will not exceed the high watermark (HWM). The high watermark can be set to 2 times the low watermark, for example. The flushing can be done by a background thread, so that the flush can be proactive and asynchronous. While the flushing is ongoing in the background, other threads can still access the database, which can reduce the latency of a transaction.

A variety of techniques can be used to flush a set of dirty pages from the memory to the flash storage 112, such as the In-Place Update (IPU) scheme, which writes dirty pages to the database file 112 directly, and the Flush Logging (FL) scheme, which writes the dirty pages to a redo log first and the database file 112 will be updated during check-pointing. If the memory is non-volatile, both the pPCache-IPU and the pPCache-FL mode can provide the atomicity, consistency, and durability guarantees. Since data in qNVRAM might be lost upon rare power loss (e.g., physically pulling out the battery or hardware failures), the database file might be corrupted if that failure happens right in the middle of the dirty page flush. In this case, the pPCache-FL mode can recover the database to a consistent point until the last successful dirty page flush. Additionally, since a lot of the mobile applications sync data with the cloud service periodically, the application can also find the lost data in the cloud server, which recovers the database to a consistent state. The FL scheme can trigger the EXT4 file system journaling when it appends flushed data to the flush log, while the file system journaling may not be triggered in the IPU scheme if the size of file is not changed. Therefore, FL can result in more data being written to flash, resulting in worse performance but a better persistency guarantee than the IPU scheme.

Recovering databases from pPCache can be fairly straightforward. An SQLite database can retrieve the page cache from the qNVRAM pool when the application restarts, and the recovery process can be carried out in the following three phases:

Analysis: The Analysis phase can scan all pages in pPCache, and rebuilds the lists of data pages and rollback pages, Undo: The Undo phase can check the state of the page cache. If it is in the in-flight state, it can go through all rollback pages and revert the uncommitted changes. Otherwise all undo pages can be discarded and freed.

Sync: In the Sync phase, the database file can be synced and all dirty pages in pPCache can be flushed to the flash storage.

For different states of the transaction, different actions can be taken to build a consistent view of the database image. When the page cache is in the in-flight state, the update of the data pages may not have been done so the data is invalid and needs to be rolled back using the rollback pages. When the page cache is in the committing state, all the updates may have been finished already, and the only remaining work is freeing the rollback pages. Therefore, the information about the state of a page cache can be useful and the update of the transaction state may be atomic. In some implementations, the state of a transaction can be stored in a 32 bit variable and thus updating such a variable can be atomic with a single store instruction.

The last phase of the recovery process can be done asynchronously. When all the aborted/uncommitted changes are rolled back, the Persistent Page Cache and the database file in the flash storage can provide a consistent view of the whole database, although the database file itself may be in some inconsistent state if the system previously crashed in the middle of flushing dirty pages to the flash storage. Therefore, a fast recovery would only involve the Analysis and Undo phase, and the database can serve queries right after the undo phase is done.

The database integrity check can be performed between the Undo and Sync phases to ensure that the data recovered from pPCache is not corrupted. This may be optional and can be enabled by the user to achieve a safer recovery.

If the data in pPCache cannot be retrieved (e.g., upon sudden power loss), it may be impossible to recover from pPCache. Then, the database may need to be recovered from either the flush log (in the pPCache-FL mode) or some other backup options (local backup or cloud backup). Recovering from the flush log can be the same as that in the WAL mode. In this scenario, although some recent transactions may be lost, the database can be in a consistent state.

Experimental Evaluation

Experiments were performed to evaluate the effectiveness of qNVRAM through implementations using pPCache. The performance of pPCache on an example mobile computing device, a SAMSUNG GALAXY S4 device with a quad-core CPU, 2 GB DRAM, and 16 GB eMMC flash memory formatted with the EXT4 file system, was evaluated. The example test device was running ANDROID 4.3 and Linux kernel 3.4. A benchmark test was implemented to issue different transactions in different patterns. In each of the tests, an SQLite table was initialized with 2000 records, each of which consisted of an integer key and 100-character value. The page cache size was configured to be 400 KB (100 4096-byte pages), while the table size is around 300 KB. A smaller page cache would not affect the experiment result since tests only performed write transactions, and the database can always find a clean page to accommodate the new data.

The performance of the pPCache-IPU and pPCache-FL implementations were evaluated against the WAL mode, since WAL represents a recent solution for the persistency enforcement problem in mobile computing devices. The qNVRAM approaches tested are orthogonal and/or complimentary to other state-of-the-art solutions, such as MVBT, single I/O commit, and file adaptive journaling. The throughput of the random and sequential transactions was measured, as well as the average latency of a single transaction with different LWM and interval time between transactions. The reliability and the recovery time were also measured. The results are discussed in the next few sections.

SQLite Transaction Throughput

Figure 5:
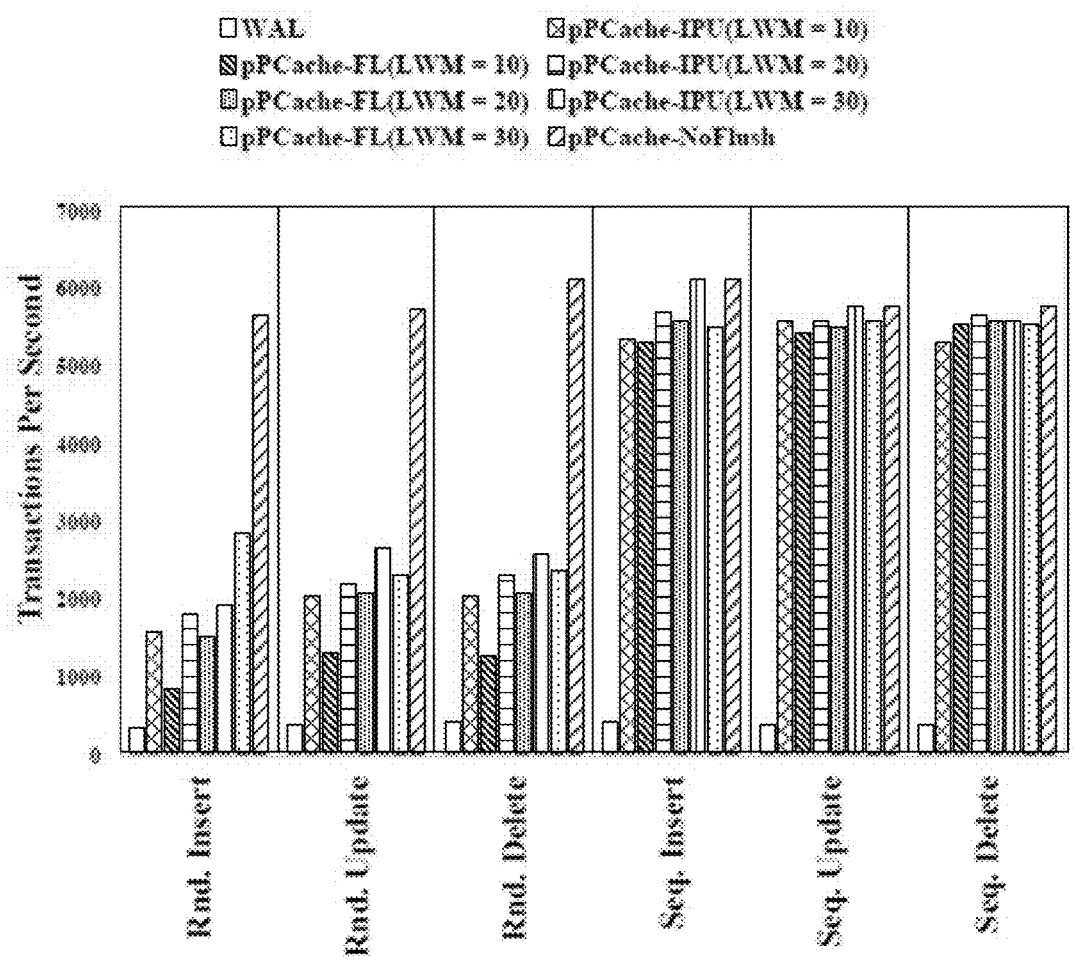
FIG. 5 depicts the results of tests comparing transaction throughput of WAL and various Persistent Page Cache techniques.

To evaluate the transaction throughput of the Persistent Page Cache, a benchmark was used that sequentially and randomly, respectively, inserted 1,000 records, updated 1,000 records, and deleted 1,000 records, of which each corresponds to a transaction (i.e., for a total of 6,000 transactions). The transactions were executed in a single thread with no interval time between two consecutive transactions. Each test case was run 10 times and reported the average throughput (transactions per second). FIG. 5 depicts the results of tests comparing transaction throughput of WAL and various Persistent Page Cache techniques. In particular, FIG. 5 depicts the results of WAL against pPCache techniques using in-place update (IPU) and flush logging (FL) (pPCache-IPU and pPCache-FL), as a function of different transaction types (random vs. sequential for insert, update and delete) and a variety of LWMs: 10, 20 and 30 dirty pages. The pPCache-IPU with an LWM of 10 was found to speed up the WAL mode in random insert, random update, random delete, sequential insert, sequential update and sequential delete by 4.51×, 5.59×, 4.71×, 13.51×, 14.06×, and 14.53×, respectively. When the LWM was increased to 30, the random insert, update, and delete get 5.50×, 7.31×, 5.89× performance boost respectively, while the sequential insert, update, and delete achieve 15.47×, 15.10×, and 15.30× speedup, respectively. When the page cache is enough to hold the whole database, dirty page flush can be disabled and the speedup was found to be 16.33×, 15.86×, and 14.13× in random insert, update, and delete transactions, respectively, and 15.40×, 15.10×, and 15.76× in sequential insert, update, and delete transactions, respectively.

The performance of sequential operations was found to drastically benefit from the write locality to the database pages. In sequential inserts, updates, and deletes, two transactions were very likely to modify the same leaf node in the B+ Tree since the records are stored in leaf nodes in a sorted fashion. The sequential insert operations were found to be used frequently in ANDROID applications since the ANDROID API guide suggests including an auto-increment key field that can be used as a unique ID to quickly find a record.

Figure 6:
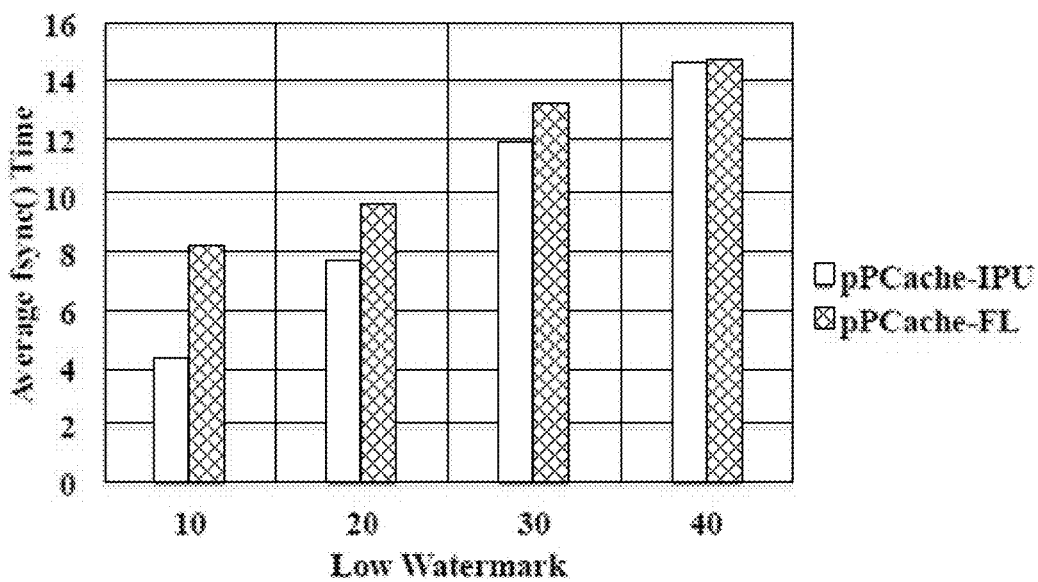
FIG. 6 depicts example experiment results for average time spent of the fsync( ) operation spent in both pPCache-IPU and pPCache-FL modes.

The performance of pPCache-FL was found to be worse than that of pPCache-IPU because in pPCache-FL the EXT4 journaling was more frequently triggered, thus resulting in random I/O patterns and a larger amount of data written to the flash storage, while in pPCache-IPU the file system journaling was not triggered if the database file size did not change. FIG. 6 depicts example experiment results for average time spent of the fsync( ) operation spent in both pPCache-IPU and pPCache-FL modes. As shown in FIG. 6, when the low watermark is set to 10, the average time spent on fsync( ) under the pPCache-IPU mode was only 52.8% of that under the pPCache-FL mode. However, as the low watermark increases, the gap between the two narrows. When the low watermark was set to 30, the fsync( ) time under pPCache-IPU was 89.3% of that under pPCache-FL, and the fsync( ) time in the two modes become comparable when the low watermark was set to 40. The reason behind this trend is that, when the number of flushed pages is 40, the pPCache-FL merely writes 20% more data (eight 4 KB journal blocks) than pPCache-IPU when the EXT4 journaling was triggered, while when the number of flushed pages is 10, pPCache-IPU writes 80% more. The fsync( ) time also reflects in the overall throughput. The gap between pPCache-IPU and pPCache-FL shrinks as the low watermark increases. The random insert, update, and delete transactions under the pPCache-IPU mode were found to be 1.87×, 1.55×, and 1.63× faster than that under the pPCache-FL mode when the low watermark was 10, and the speedup lowers to 1.10×, 1.14×, and 1.09× when the low watermark increases to 30.

Figure 7:
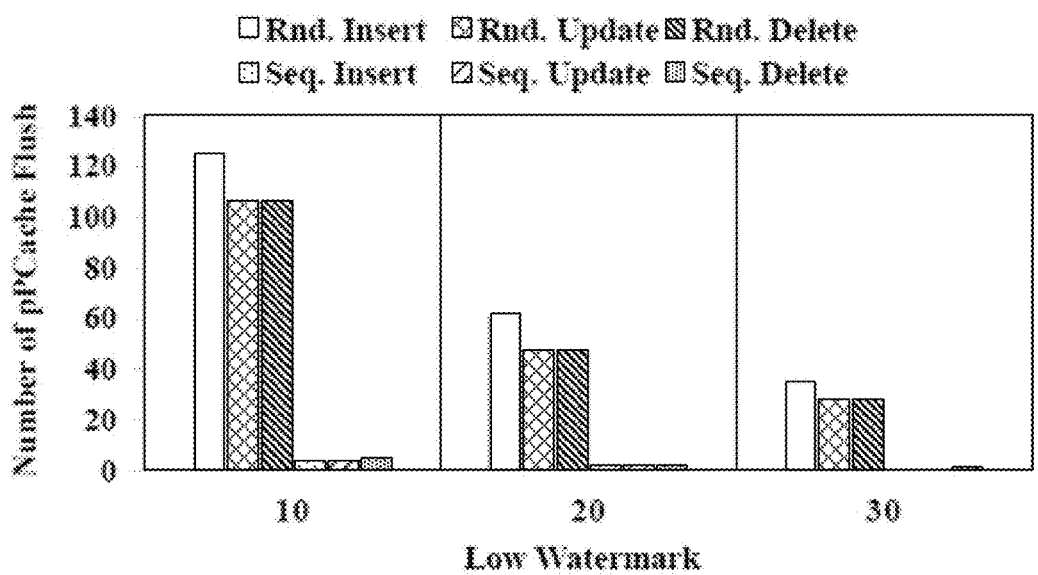
FIG. 7 depicts example experiment results showing the number of pPCache flushes in random and sequential insert, update, and delete transactions across different watermark levels.

FIG. 7 depicts example experiment results showing the number of pPCache flushes in 1,000 random and sequential insert, update, and delete transactions across different watermark levels. When LWM was set to 10, the 1,000 random insert, update and delete transactions respectively were found to trigger the background flush 136.8, 105.0, and 103.2 times on average, while only 3.0, 3.0 and 4.0 flushes are triggered during the 1,000 sequential insert, update and delete transactions respectively. While the low watermark was increased, the number of flushes was found to decrease. When LWM was set to 20, the 1,000 random insert, update and delete transactions only triggers 60.0, 40.0 and 45.6 flushes respectively, and those numbers were found to decrease to 35.0, 27.0 and 27.0 respectively if the low watermark was increased to 30. The decrease in the number of triggered flushes explains why the throughput increases when the LWM was increased.

Figure 8:
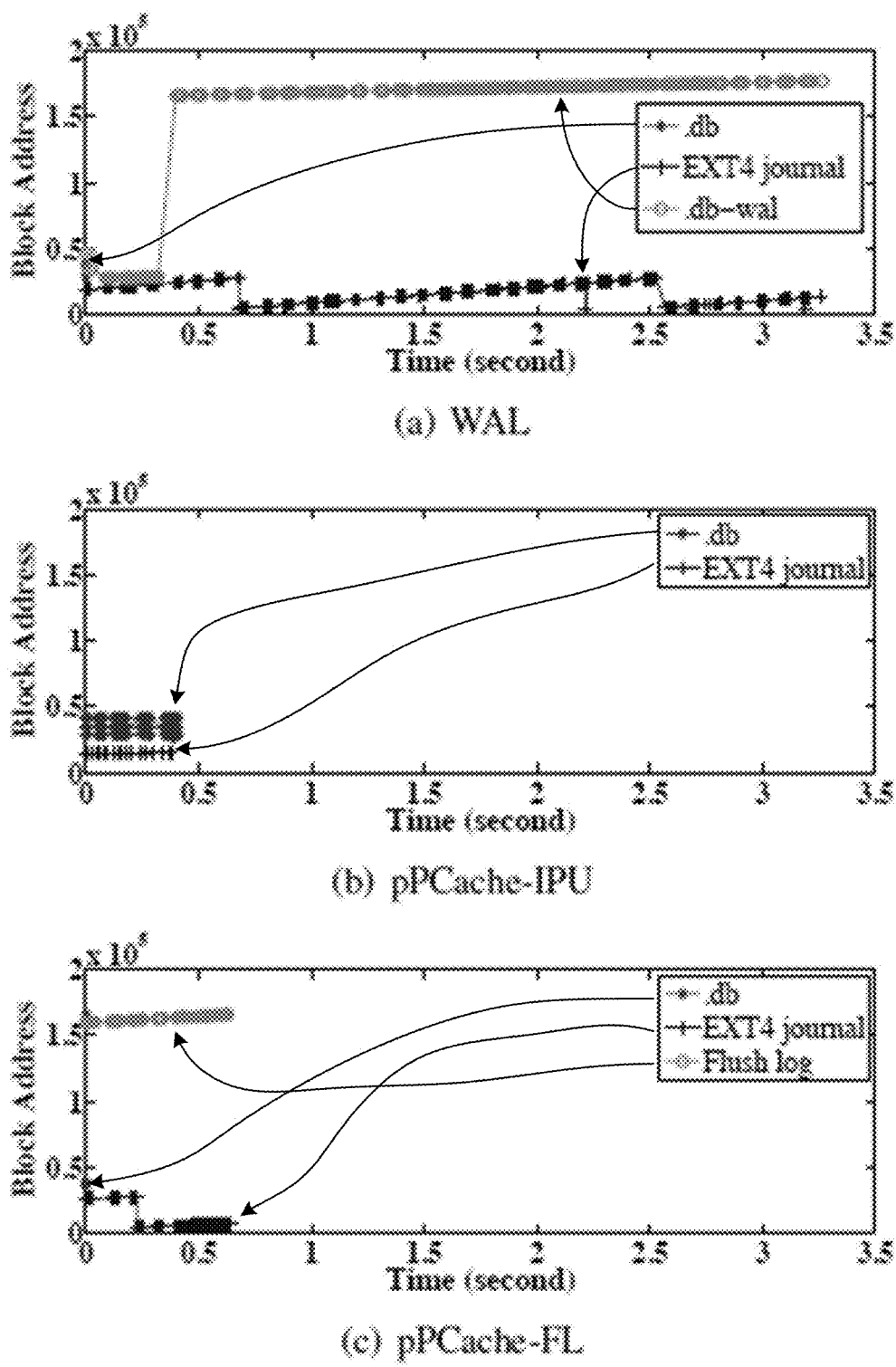
FIG. 8 depicts example experiment results for I/O block traces of insert transactions in SQLite under WAL, pPCache-IPU, and pPCache-FL modes.

FIG. 8 depicts example experiment results for I/O block traces of 1,000 insert transactions in SQLite under WAL, pPCache-IPU, and pPCache-FL modes. In particular, FIG. 8 depicts the time-address distribution of blocklevel I/O requests of 1,000 random insert transactions as a function of different journaling schemes. In the WAL mode, a single insert transaction was found to result in approximately 8 to 16 KB data written to the log file and 20 KB data written to the EXT4 journal. In the pPCache-IPU mode, when the dirty page flush is triggered, 20 4 KB pages were written to the .db file. When the size of the database file remains unchanged, the fsync( ) did not trigger file system journaling. As shown in FIG. 8(b), there were only 18 EXT4 journal commits in the 1,000 insert transactions. In the pPCache-FL mode, the same 20 dirty pages were appended to a separate flush log file, and thereafter the fsync( ) call triggered the EXT4 journaling. Both pPCache-IPU and pPCache-FL were found to significantly reduce the number of fsync( ) calls, as well as the amount of data written to the flash storage. The WAL mode wrote 13.94 MB (8.10 MB EXT4 journal blocks and 5.80 MB WAL log blocks and 0.04 MB table file blocks) to the flash storage, while it is only 2.01 MB (1.59 MB table file blocks and 0.42 MB EXT4 journal blocks) for pPCache-IPU and 2.88 MB (1.19 MB EXT4 journal blocks, 1.62 MB flush log blocks, and 0.16 MB table file blocks) for pPCache-FL. These results were found to strongly indicate that both pPCache-IPU and pPCache-FL can significantly reduce the number of EXT4 journal commits, as well as the volume of I/Os destined to the database files.

Transaction Latency

Figure 9:
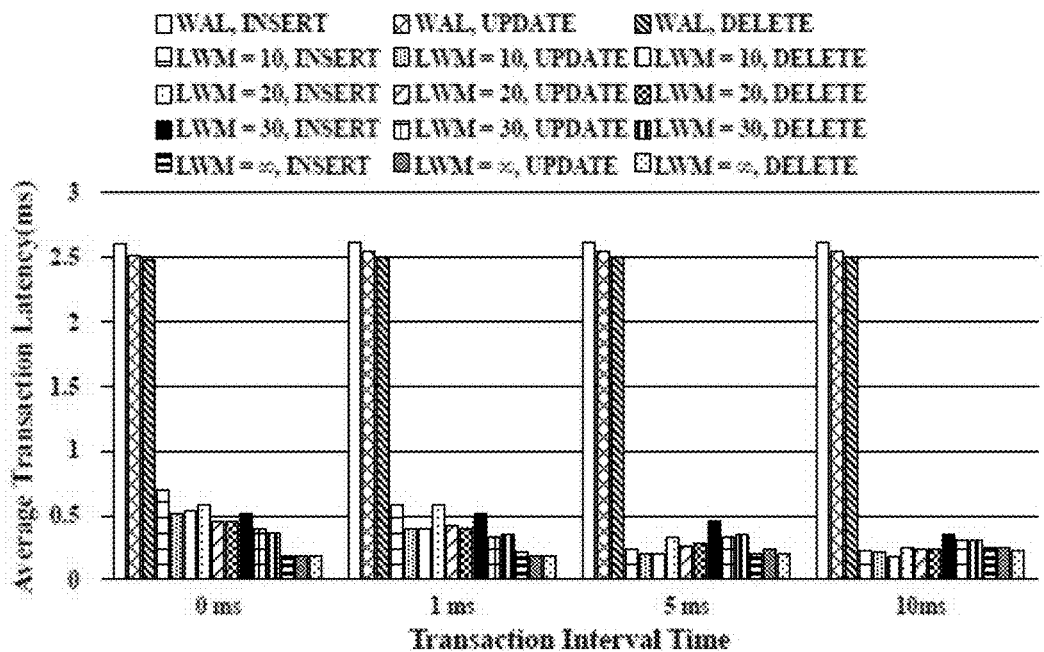
FIG. 9 depicts the example experiment results for the average latency of an insert, update and delete transaction with different interval time under the pPCache-IPU mode.

To evaluate the average latency of a transaction, slight modifications were made to the benchmark and an interval time was added between two consecutive transactions. FIG. 9 depicts the example experiment results for the average latency of an insert, update and delete transaction with different interval time under the pPCache-IPU mode. The result for pPCache-FL were found to be similar to, yet slightly worse than pPCache-IPU because the dirty page flush takes a longer time. All of the observations could also apply to the pPCache-FL mode.

As shown in FIG. 9, the pPCache-IPU mode has significantly lower transaction latency than the WAL mode. When the transactions were executed with no interval time, the average latencies of the insert, update and delete transactions under the WAL mode are respectively 3.83×, 5.10×, and 4.68× longer than those under pPCache-IPU with an LWM of 10, 4.52×, 5.72×, and 5.67× longer than those under pPCache-IPU with an LWM of 20, and 5.17×, 6.84×, and 6.92× longer than those under pPCache-IPU with an LWM of 30. When the LWM is set to ∞, the dirty pages were never flushed, and in this scenario, pPCache reduced the average latencies of random insert, update and delete transactions by 93.0%, 92.8%, and 93.0% respectively.

Moreover, when the interval time between transactions was increased, the average latency was found to decrease because it left more time for the background thread to flush dirty pages to the flash storage. Under the pPCache-IPU mode with an LWM of 20, the insert, update and delete transaction latencies, when the transaction interval time is 1 ms, were respectively only 93.9%, 90.9% and 91.5% of those when there is no interval time between consecutive transactions, and this ratio was found to decrease to 41.1%, 52.7% and 53.1% as the interval time was increased to 10 ms.

An interesting observation was that as the interval time between two consecutive transactions increased, pPCache with a smaller LWM exhibited a smaller transaction latency than that with a larger LWM. As shown in FIG. 9, when the interval time between two consecutive transactions was 5 ms, the latencies of the insert, update and delete transactions with an LWM of 30 were found to be respectively 2.25×, 1.60×, and 1.66× longer than those with an LWM of 10, and 1.37×, 1.28×, and 1.24× longer than those with an LWM of 20. The reason behind this was that a larger LWM usually led to a longer time to finish fsync( ) since more dirty pages need to be written to the flash storage. When the dirty pages could not be flushed fast enough, the transactions had to wait for the flush thread to clean the dirty pages, which slowed down the transaction response time.

Reliability

To verify the reliability of qNVRAM upon different types of crashes, a set of crash-recovery tests were performed on an example mobile computing device (the SAMSUNG GALAXY S4 smartphone). The tests started with a SQLite benchmark, which kept issuing the insert, update and delete transactions. The SQLite was configured in the pPCache-IPU mode. The crash simulation was performed by injecting specific types of failures to the benchmark process or the operating system. These tests focus on software failures, and do not simulate low-level hardware faults, such as random bit flips in DRAM (soft errors), because they are considered very rare.

The tests tried different ways to crash the application and the kernel. The tests simulate application crash by killing the benchmark process. The tests injected 3 types of kernel faults, kernel hang, null pointer and kernel panic. To simulate the kernel hang fault, tests started with four kernel threads, and each thread tries to acquire a spinlock using spin lock irq( ) in an infinite loop. This will result in the kernel hang since preemption and interrupt are disabled in all four CPU cores of the smartphone under test. Tests simulated the null pointer fault by dereferencing a null pointer in the power key interrupt handler. Tests simulated the kernel panic fault by directly calling the panic( ) function. To test qNVRAM flush-on-fail mechanisms, tests injected two types of faults. Tests scheduled the delayed work that executes the save routine 10 seconds after the power key is pressed. This test is to simulate the schedule faults where the delayed work will not be executed in time. In the second type of faults, referred to as the I/O fault, tests modified the save routine so that the data will not be flushed to the flash storage in the 5-second time window. Tests also tested the hard reset without any injected faults to simulate the case where the user-space died and the smartphone is powered off by hard reset. All types of failures have been tested at least 30 times each.

Table 5 shows the results of different crash scenarios. In all the crashes, no data in qNVRAM was lost or corrupted. As shown in the table, dereferencing a null pointer led to kernel panic and thus the tested smartphone being rebooted. The kernel hang also resulted in the tested smartphone being rebooted because the heartbeat was not received by the watchdog before it timed out. In the schedule and I/O failure tests, the tested smartphone was also rebooted by the watchdog. The data was found in the DRAM after reboot by either panic( ) or hardware watchdog. Therefore, as long as there were no sudden power losses, qNVRAM performed with a reasonable level of reliability.

TABLE 5

| Crash Type | Symptoms | Data Corruption |
|---|---|---|
| Application crash | application process killed | No |
| Null ptr | reboot by panic( ) | No |
| Kernel hang | reboot by watchdog | No |
| Kernel panic | reboot by panic( ) | No |
| Schedule | reboot by watchdog | No |
| I/O | reboot by watchdog | No |
| Hard reset | power-off | No |

Recovery Performance

Figure 10:
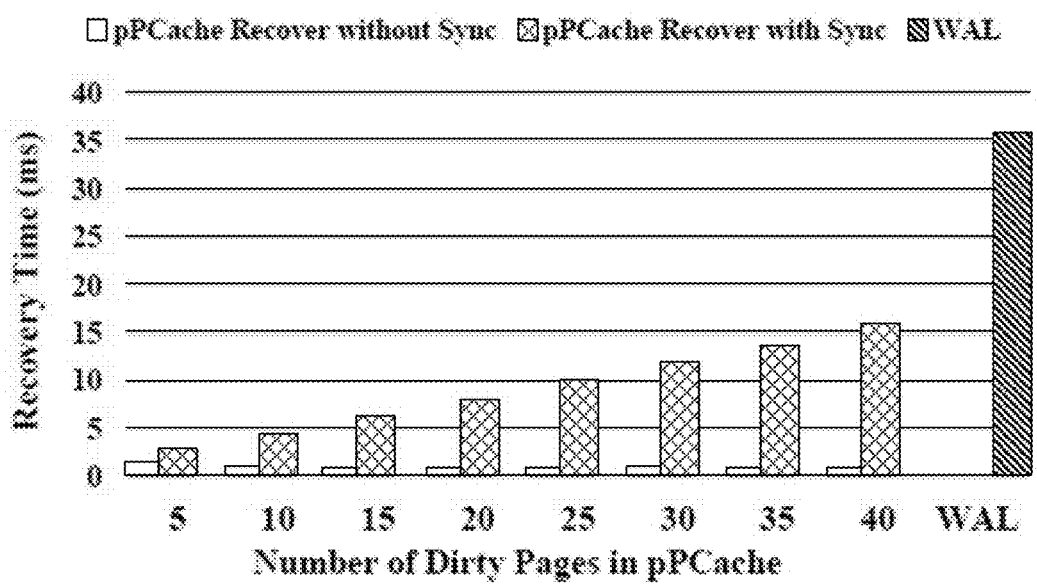
FIG. 10 shows example experiment results for recovery times of Persistent Page Caches.

FIG. 10 shows example experiment results for recovery times of Persistent Page Caches. When the number of dirty pages is small (e.g., 5 pages), the recovery was found to typically be done in less than 3 ms, which is only 6.94% of that used in the WAL mode, even if the database file is synced after the undo phase. However, as the number of dirty pages increased, the recovery time also increased when database file sync was enabled. But the recovery time was still significantly shorter than that used in the WAL mode since recovery from the write-ahead log was used to replay the whole log file. When there were 40 dirty pages in the pPCache, the recovery of pPCache was found to still be more than 2× faster than that of the write-ahead log.

Example Technique

Figure 11:
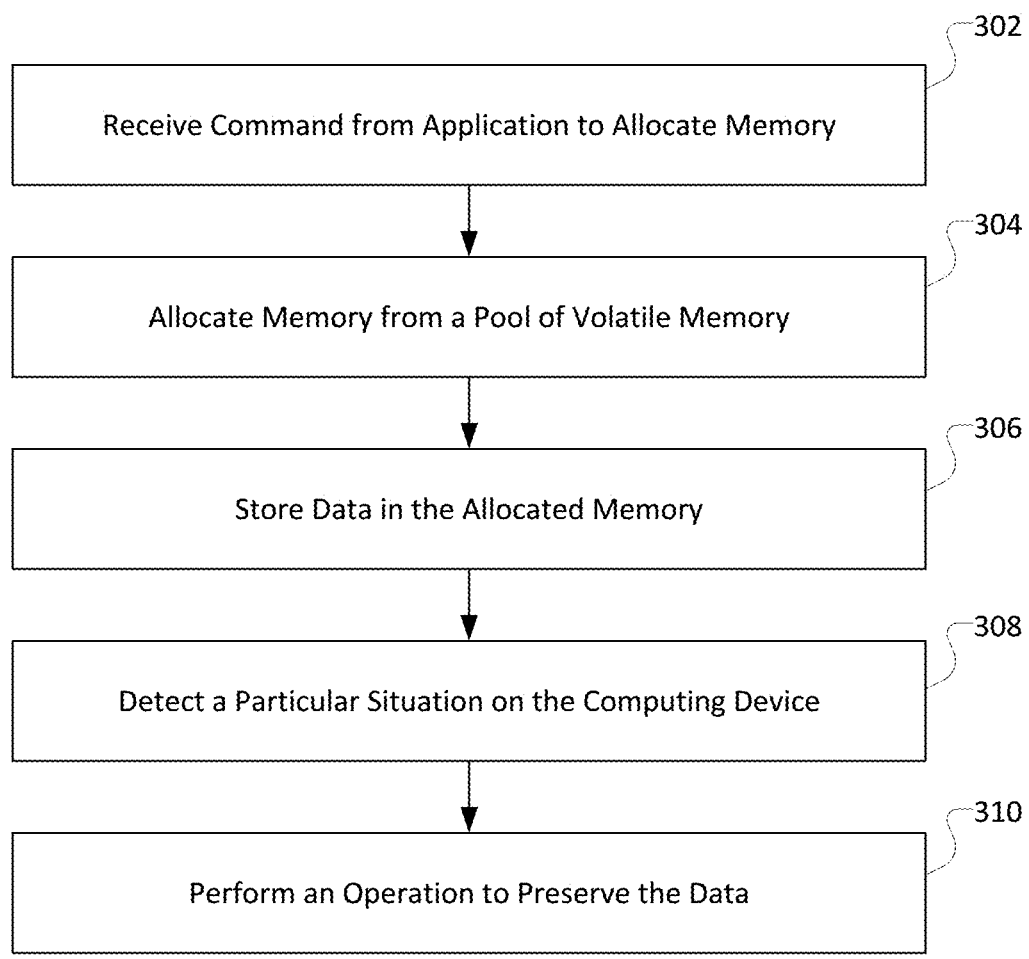
FIG. 11 is a flowchart of an example technique for using qNVRAM on a mobile computing device.

FIG. 11 is a flowchart of an example technique 300 for using qNVRAM on a mobile computing device, such as the computing device 100 described above with regard to FIG. 1.

The example technique 300 can begin with a driver running on the mobile computing device receiving a command from an application for allocation of volatile memory to be used by the application (302). The command may have first been received by a library (e.g., API) running on the mobile computing device, which may relay the command to the driver. For example, one of the applications 102 may provide a command through the library 104, which can redirect the command to the driver 106.

In response to receiving the command, the driver can allocate memory for the application from a pool of volatile memory (304). For example, the driver 106 can allocate a portion of the pool 118 of the volatile memory 110 for the application 102. Data can be stored in the allocated memory (306). For example, the application 102 can write data to the allocated memory 118, using the library 104, the driver 106, and/or the file system for the device 100.

The driver can detect that a particular situation exists on the computing device that may indicate that the stored data will be lost unless appropriate action is taken (308). For example, the driver 106 can detect situations in which the data can be preserved in volatile memory 110 (power to volatile memory 110 will not be lost) but in which the data will be lost with regard to the application 102, such as the application 102 crashing and restarting, the application 102 hanging and restarting, and the operating system for the computing device 100 rebooting. In another example, the driver 106 can detect situations in which the data cannot be preserved in volatile memory 110 (power to volatile memory 110 will be lost) and the data will need to be flushed to non-volatile memory 112, such as a hard reset being performed on the device 100.

In response to detecting the particular situation, the driver of the computing device can perform an operation to preserve the data following the conclusion of the particular situation (310). For example, in the first example situation in the previous paragraph, the data can be remapped within the volatile memory 110 by the driver 106 so that it is accessible when the application 102 and/or the operating system restart. In the second example situation in the previous paragraph, the data can be flushed from the volatile memory 110 to the non-volatile memory 112 and, upon power being restored to the device 100, can be read back into the volatile memory 110 from the non-volatile memory 112.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. In some cases, the actions recited in the claims can be performed in a different order and still achieve desirable results.

A number of implementations have been described. Nevertheless, it will be understood that various modifications may be made without departing from the spirit and scope of the invention. For example, the disclosed techniques can be applied to non-mobile computing devices as well, such as desktop computer, servers, and embedded computing devices. These techniques can be applied to other types of volatile and non-volatile memory as well.

Accordingly, other implementations are within the scope of the following claims.

What is claimed is:

1. A computing device comprising:
   one or more processors;
   a local power source that provides power to the computing device;
   volatile memory that is configured to persistently store data and instructions to be used by the one or more processors so long as the computing device is continuously supplied with power by the local power source or an external power source;
   non-volatile memory that is configured to persistently store data and instructions;
   a library that is programmed to receive memory commands from applications that are installed on the computing device; and
   a driver that is programmed to (i) manage the volatile memory, (ii) monitor for situations on the computing device in which data stored in the volatile memory will be lost, (iii) in response to detecting a first type of the situations, remap volatile memory for one or more of the applications, and (iv) in response to detecting a second type of the situations, flush the volatile memory to the non-volatile memory, wherein management of the volatile memory comprises performing the memory commands received by the library.

2. The computing device of claim 1, wherein the volatile memory comprises random access memory (RAM).

3. The computing device of claim 2, wherein the RAM comprises dynamic RAM (DRAM).

4. The computing device of claim 1, wherein the power source comprises one or more batteries.

5. The computing device of claim 1, wherein the non-volatile memory comprises flash memory.

6. The computing device of claim 1, wherein the computing device comprises a mobile computing device.

7. The computing device of claim 1, wherein the memory commands include one or more of: memory allocation commands, memory retrieval commands, and memory freeing commands.

8. The computing device of claim 1, wherein the first type of the situations comprises the one or more applications crashing and restarting on the computing device.

9. The computing device of claim 1, wherein the first type of the situations comprises the one or more applications hanging and restarting on the computing device.

10. The computing device of claim 1, wherein the first type of the situations comprises an operating system running for the computing device rebooting.

11. The computing device of claim 1, wherein the second type of the situations comprises a hard reset being initiated on the computing device.

12. The computing device of claim 1, wherein:
a portion of the volatile memory is designated for mapping volatile memory to an application address space that is used by the applications, and
the remapping comprises updating the portion of the volatile memory to include current mappings between the volatile memory and the application address space in response to detecting the first type of the situations.

13. A computer-implemented method comprising:
receiving, at a driver running on a mobile computing device with a local power source, a command from an application for an allocation of volatile memory;
allocating, by the driver, memory from a pool of volatile memory for the application;
storing data in the allocated memory;
detecting, by the driver, that a particular situation currently exists on the mobile computing device that will cause the data to be lost; and
performing, by the driver, an operation with regard to the memory and the data that will cause the data to be preserved following a conclusion of the particular situation wherein the operation comprises remapping the data in the pool of memory for the application, wherein remapping the volatile memory for the application comprises updating a portion of the volatile memory to include current mappings between the volatile memory and an application address space that is used by the application.

14. The computer-implemented method of claim 13, wherein the particular situation comprises the application crashing and restarting on the mobile computing device.

15. The computer-implemented method of claim 13, wherein the particular situation comprises the application hanging and restarting on the computing device.

16. The computer-implemented method of claim 13, wherein the particular situation comprises an operating system running for the computing device rebooting.

17. The computer-implemented method of claim 13, wherein the operation comprises flushing the data from the volatile memory to non-volatile memory on the mobile computing device.

18. The computer-implemented method of claim 17, wherein the particular situation comprises a hard reset being initiated on the computing device.

19. A method comprising:
providing, on a computing device, a driver that is programmed to manage volatile memory of the computing device, wherein the computing device further comprises (i) one or more processors, (ii) a local power source that provides power to the computing device, (iii) non-volatile memory that is configured to persistently store data and instructions, and (iv) a library that is programmed to receive memory commands from applications that are installed on the computing device, wherein the volatile memory is further configured to persistently store data and instructions to be used by the one or more processors so long as the computing device is continuously supplied with power by the local power source or an external power source;
monitoring, by the driver, for situations on the computing device in which data stored in the volatile memory will be lost;
remapping, by the driver and in response to detecting a first type of the situations, volatile memory for one or more of the applications; and
flushing, by the driver and in response to detecting a second type of the situations, the volatile memory to the non-volatile memory, wherein management of the volatile memory comprises performing the memory commands received by the library.

20. The method of claim 19, wherein:
the first type of the situations includes one or more of: (i) the one or more applications crashing and restarting on the computing device, (ii) the one or more applications hanging and restarting on the computing device, and (iii) an operating system running for the computing device rebooting, and
the second type of the situations includes a hard reset being initiated on the computing device.

* * * * *